United States Patent
Kohira et al.

(10) Patent No.: US 6,774,901 B2
(45) Date of Patent: Aug. 10, 2004

(54) THREE-DIMENSIONAL IMAGE PROCESSING METHOD AND APPARATUS, READABLE STORAGE MEDIUM STORING THREE-DIMENSIONAL IMAGE PROCESSING PROGRAM AND VIDEO GAME SYSTEM

(75) Inventors: Toshio Kohira, Osaka (JP); Tatsuya Shinkai, Suita (JP)

(73) Assignee: Konami Corporation, Tokyo (JP)

( * ) Notice: Subject to any disclaimer, the term of this patent is extended or adjusted under 35 U.S.C. 154(b) by 342 days.

(21) Appl. No.: 10/047,806

(22) Filed: Oct. 23, 2001

(65) Prior Publication Data

US 2002/0060682 A1 May 23, 2002

(30) Foreign Application Priority Data

Oct. 31, 2000 (JP) ...................................... 2000-333815

(51) Int. Cl.[7] .............................................. G06T 15/00
(52) U.S. Cl. ...................................................... 345/473
(58) Field of Search ................................ 345/473, 474, 345/475, 419, 420, 581, 582

(56) References Cited

U.S. PATENT DOCUMENTS 6,234,901 B1    5/2001  Nagoshi et al. ............... 463/33
6,626,954 B1 *  9/2003  Kamachi et al. ........... 715/500.1

FOREIGN PATENT DOCUMENTS

| EP | 0860186     | 8/1998 |
| JP | 10201947    | 8/1998 |
| JP | 10-201947   | 8/1998 |
| JP | 2000-197769 | 7/2000 |
| JP | 2000-233072 | 8/2000 |

OTHER PUBLICATIONS

"Approximate General Sweep Boundary of a 2D Curved Object" Jae–Woo Ahn et al., CVGIP Graphical Models and Image Processing, vol. 55, No. 2, Mar. 1993, pp. 98–1289.

* cited by examiner

*Primary Examiner*—Phu K. Nguyen
(74) *Attorney, Agent, or Firm*—Jordan and Hamburg LLP (57) ABSTRACT

First, positions at opposite widthwise sides where a trace is to be created are calculated. Then, the calculated positions are successively determined as vertices to generate a polygon for the trace. Subsequently, a texture suitable for the type of the slope with which a snowboard is in contact is selected. Whether or not the selected texture has been changed is then discriminated. If the selected texture has been changed, a transparent processing is applied to textures before and/or after a change and these textures are adhered to polygons before and/or after the change. Accordingly, a three-dimensional image processing apparatus can realistically and easily create a trace formed on a ground surface or a water surface as a character runs or slides.

20 Claims, 10 Drawing Sheets

THREE-DIMENSIONAL IMAGE PROCESSING METHOD AND APPARATUS, READABLE STORAGE MEDIUM STORING THREE-DIMENSIONAL IMAGE PROCESSING PROGRAM AND VIDEO GAME SYSTEM

The present invention relates to a three-dimensional (3D) image processing technique of applying a specified image processing to display a model located in a simulated 3D space on a monitor after rendering it, which technique is applied, for example, to video game systems and computer graphics (CG) images.

BACKGROUND OF THE INVENTION AND RELATED ART STATEMENT

In recent years, various game systems in which characters are displayed in a simulated 3D space generated on a monitor screen have been spread. Some of such game systems are known to simulate car race, skiing, surfing, motor-booting, snow boarding, skate boarding, etc.

Further, in these games in which a character runs (or slides) on a ground surface or water surface, the presence of the game largely differs depending on how realistically a change in a background image resulting from the character's movement is expressed.

Particularly, in a car race game in which a character drives on a dirt course, a skiing or snow board game in which a character slides on a slope or a CG image, a better presence can be given if a trace formed on the ground as the character drives (or slides) is created, with the result that games and CG images rich in ingenuity can be realized.

SUMMARY OF THE INVENTION

In view of the above situation, an object of the present invention is to provide image processing method and apparatus for realistically and easily creating a trace formed on a ground surface or water surface as a character drives or slides, a readable storage medium storing a 3D image processing program and a video game system.

In order to achieve the above object, according to the present invention, a three-dimensional image processing apparatus for creating an image of a trace having a width and formed on a ground surface or a water surface as a 3-D model (three dimensional model) having a width moves in contact with the ground surface or the water surface, which comprises position calculating means for calculating positions at opposite widthwise sides where the trace is to be created at specified time intervals, polygon generating means for generating polygons for the trace by successively determining the calculated positions at the opposite widthwise sides as vertices, polygon storage means for storing the generated polygons, texture storage means for storing textures to be adhered to the polygons, and texture adhering means for adhering the textures stored in the texture storage means to the polygons. With the above construction, the polygons for the trace can be easily generated by successively determining, as the respective vertices, the positions at the opposite widthwise sides where the trace is to be created. An image of the trace can be realistically and easily created by adhering the textures to these polygons.

These and other objects, features and advantages of the present invention will become more apparent upon a reading of the following detailed description and accompanying drawings.

DETAILED DESCRIPTION OF THE PREFERRED EMBODIMENTS OF THE PRESENT INVENTION

Figure 1:
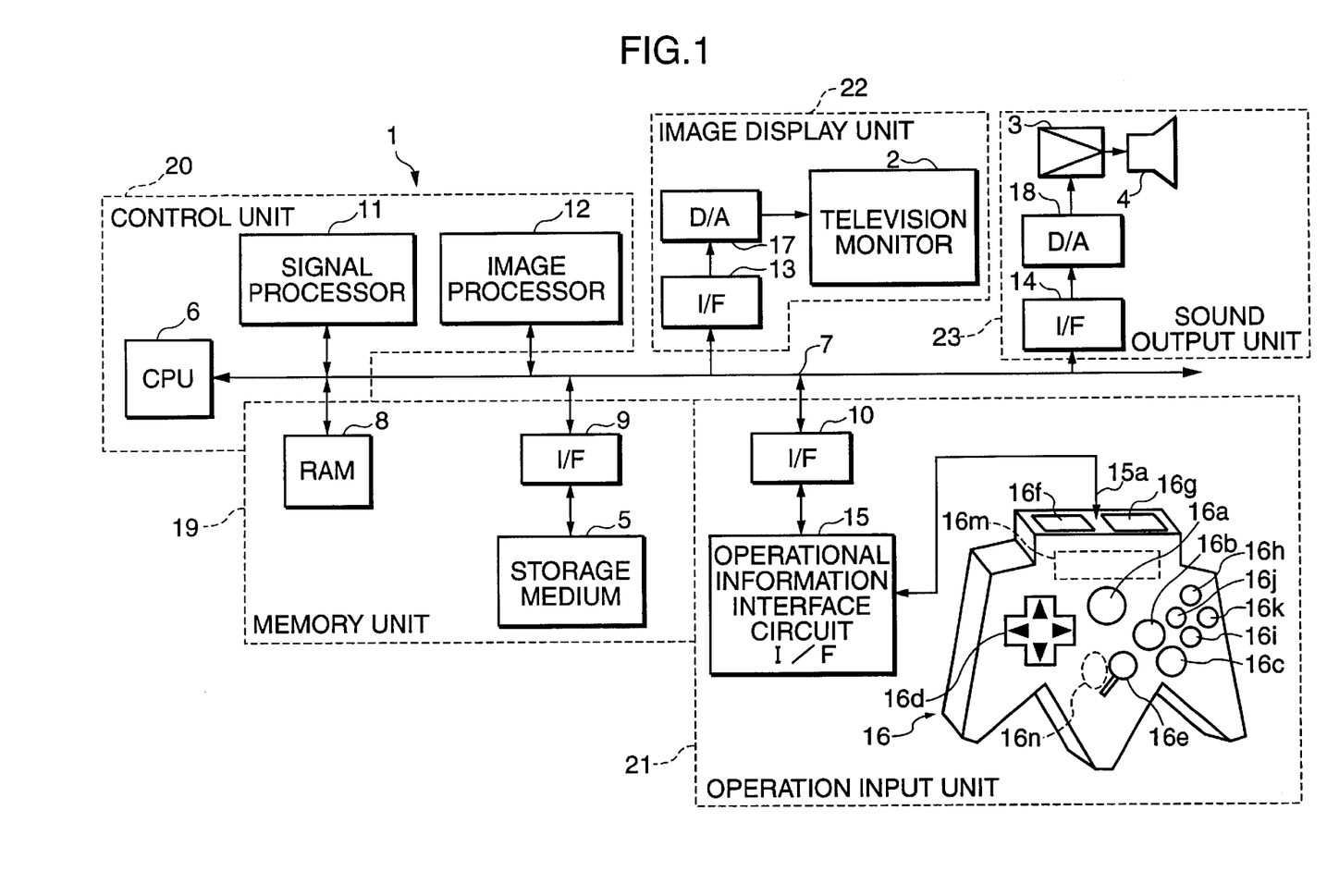
FIG. 1 is a block diagram showing one embodiment of a video game system according to the present invention.

FIG. 1 is a block diagram showing one embodiment of a video game system according to the present invention. This game system 1 is provided with a main game unit, a television monitor 2 for displaying images of a game, an amplifying circuit 3 and a loudspeaker 4 for outputting sound effects and the like during a game, and a storage medium 5 storing game data including image data, sound data and program data. The storage medium 5 may be a so-called ROM cassette in which a ROM storing the game data and a program data of an operating system is contained in a plastic casing, an optical disk or a flexible disk. Depending on the mode of the game system 1, a built-in type ROM or the like may be used.

The main game unit is constructed such that buses 7 including address busses, data buses and control buses are connected with a CPU 6; a RAM 8, interface circuits 9, 10, a signal processor 11, an image processor 12, and interface circuits 13, 14 are connected with the buses 7; a controller 16 is connected with the interface circuit 10 via an operational information interface circuit 15; a digital-to-analog (D/A) converter 17 is connected with the interface circuit 13; and a D/A converter 18 is connected with the interface circuit 14.

A memory unit 19 is constructed by the RAM 8, the interface circuit 9 and the storage medium 5; a control unit 20 for controlling the progress of the game is constructed by the CPU 6, the signal processor 11 and the image processor 12; an operation input unit 21 is constructed by the interface circuit 10, the operational information interface circuit 15 and the controller 16; an image display unit 22 is constructed by the television monitor 2, the interface circuit 13 and the D/A converter 17; and a sound output unit 23 is constructed by the amplifying circuit 3, the loudspeaker 4, the interface circuit 14 and the D/A converter 18.

The signal processor 11 mainly performs calculation of positions of characters in a simulated 3D space, calculation to transform a position in the simulated 3D space to the one in a two-dimensional (2D) space, light source calculation, and reading and combination of various sound data.

The image processor 12 positions polygons forming an image to be formed in a display area of the RAM 8 and applies rendering such as texture mapping to these polygons based on the calculation result of the signal processor 11.

The controller 16 is provided with various buttons for selecting game contents, instructing the start of the game, and instructing actions, direction, etc. to a main character.

The mode of the game system 1 differs depending on its application. Specifically, the television monitor 2, the amplifying circuit 3 and the loudspeaker 4 are separate from the main game unit in the case that the game system 1 is constructed for home use, whereas all the elements shown in FIG. 1 are contained as a unit in one casing in the case that the game system 1 is constructed for business use.

In the case that the game system 1 is constructed with a personal computer or a workstation as a core, the television monitor 2 corresponds to a computer display, the image processor 12 corresponds to part of the game program data stored in the storage medium 5 or hardware on an extension board mounted on an extension slot of the computer, and the interface circuits 9, 10, 13, 14, the D/A converters 17, 18, and the operational information interface circuit 15 correspond to hardware on the extension board mounted on the extension slot of the computer. Further, the RAM 8 corresponds to a main memory of the computer or the respective areas of an extension memory.

A case where the game system 1 is constructed for home use is described below.

First, the operation of the game system 1 is briefly described. When a power switch (not shown) is turned on to activate the video game system 1, the CPU 6 reads image data, sound data and game program data from the storage medium 5 in accordance with the operating system stored in the storage medium 5. Part or all of the read image data, sound data and game program data are stored in the RAM 8.

Thereafter, the game is proceeded by the CPU 6 in accordance with the game program data stored in the RAM 8 and contents of instructions given by a game player via the controller 16. In other words, commands as tasks for forming images and outputting sounds are suitably generated in accordance with contents of instructions given by the game player via the controller 16.

The signal processor 11 performs calculation of positions of characters in the 3D space (of course the same applies for the 2D space), a light source calculation, reading and combination of various sound data in accordance with these commands.

Subsequently, the image processor 12 writes the image data to be formed in the display area of the RAM 8 based on the calculation result of the signal processor 11. The image data written in the RAM 8 is supplied via the interface circuit 13 to the D/A converter 17, which then supplies the image data to the television monitor 2 to display it as an image on the screen of the television monitor 2 after converting it into an analog video signal.

On the other hand, the sound data outputted from the signal processor 11 is supplied via the interface circuit 14 to the D/A converter 18, which in turn converts it into an analog sound signal (via a filter or the like). The converted signal is outputted as a game sound from the loudspeaker 4 as a sound generating means via the amplifying circuit 3. The game sounds refer to BGMs, various sound effects, presentation sounds, voices, etc.

Figure 2:
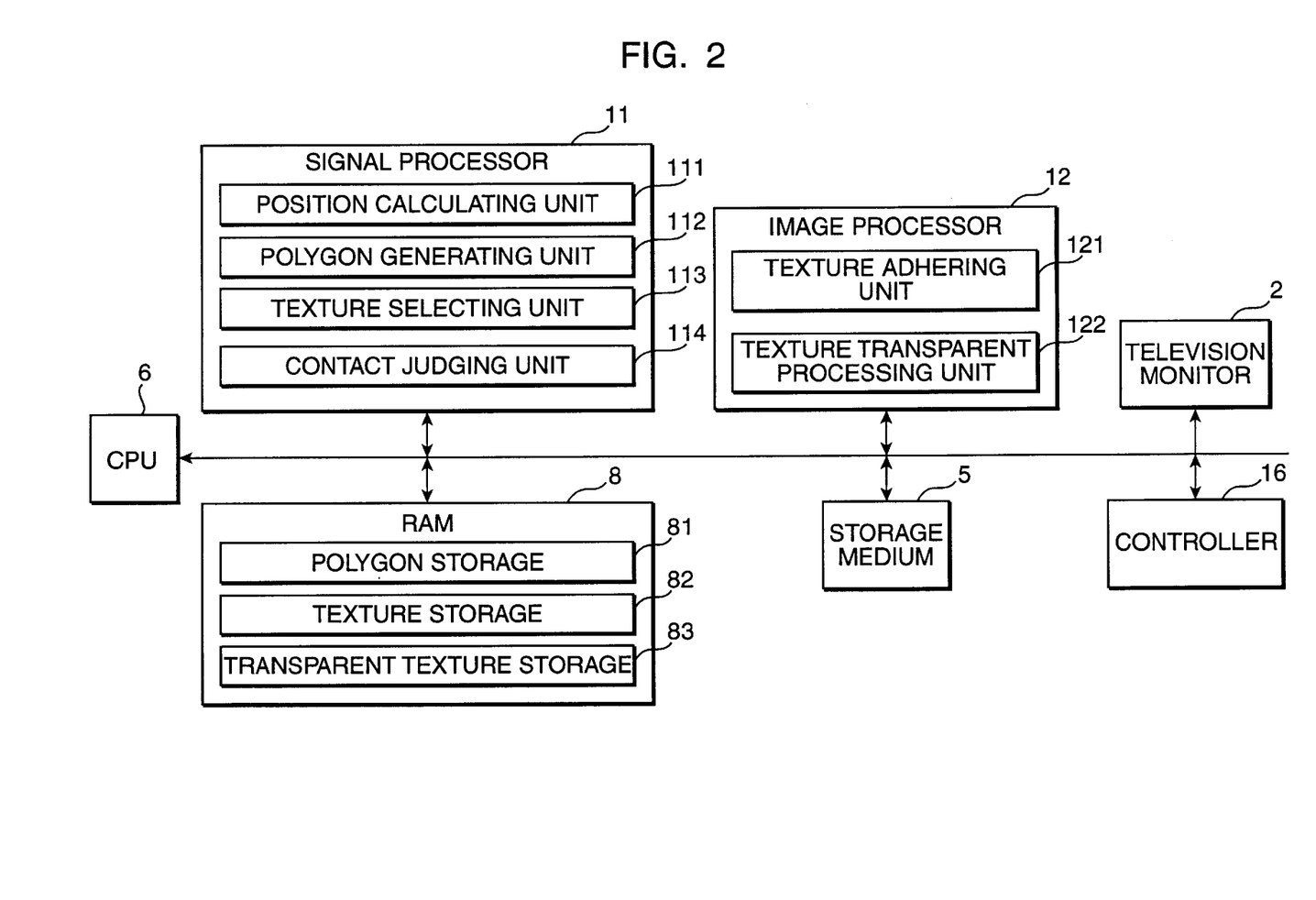
FIG. 2 is a block diagram showing an essential portion of a 3D image processing apparatus.

FIG. 2 is a block diagram showing an essential portion of a 3D image processing apparatus. The signal processor 11 is provided with a contact judging unit 114 for judging whether or not a 3-D model (three dimensional model) is in contact with a ground or water surface, a position calculating unit 111 for calculating positions at the opposite widthwise sides of a trace created by the contact of the 3-D model with the ground or water surface, a polygon generating unit 112 for generating polygons of the trace by successively determining the positions at the opposite widthwise sides where the trace is to be created as vertices, and a texture selecting unit 113 for determining a texture corresponding to the ground or water surface with which the 3-D model is in contact from a plurality of textures for the trace stored in a texture storage 82 to be described later.

The contact judging unit 114 judges the contact of a polygon forming the ground or water surface and a polygon forming the 3-D model in a simulated 3D space. In the case that the two polygons are in contact, there are three types of contact: point contact, line contact and surface contact. In this embodiment, a surface contact is assumed when the two polygons are discriminated to be in contact.

The position calculating unit 111 calculates the positions at the opposite widthwise sides of the trace created by the contact of the 3-D model with the ground or water surface at intervals of a specified time (e.g. every frame) based on the facing direction and the moving direction of the 3-D model. In the case that the configuration of the surface (hereinafter, "contact surface") of the 3-D model in contact with the ground or water surface is complicated, the positions at the opposite widthwise sides of the trace to be created may be calculated after performing a processing to approximate the configuration of the contact surface to a simpler configuration as described later.

The polygon generating unit 112 successively determines the positions at the opposite widthwise sides of the trace calculated by the position calculating unit 111 as vertices of a polygon to generate the polygon of the trace. Here, the positions at the opposite widthwise sides of the trace (i.e. two positions) are calculated by the position calculating unit 111, for example, the left one of these two positions with respect to the moving direction may be determined as a vertex prior to the right one in determination of the respective vertices of the polygon by the polygon generating unit 112.

The texture selecting unit 113 selects a texture suitable for the type of the ground or water surface with which the 3-D model is in contact from a plurality of textures for the trace stored in the texture storage 82 to be described later. In this embodiment, a case of creating a trace when a snow board slides on a slope is described. For example, textures for deep traces correspond to soft snow slopes, whereas textures for shallow traces correspond to hard snow slopes. The texture selecting unit 113 selects a texture for deep trace in the case that the snow board slides on a soft snow slope while selecting a texture for shallow trace in the case that it slides on a deep snow slope.

The image processor 12 is provided with a texture adhering unit 121 for adhering the texture selected by the texture selecting unit 113 to the polygon of the trace generated by the polygon generating unit 112, and a texture transparent processing unit 122 for applying a transparent processing to the texture in a stepwise manner.

The texture transparent processing unit 122 applies the transparent processing in a specified number of steps to the textures before and after a change in the case that the texture selected by the texture selecting unit 113 is changed as the 3-D model is moved. The textures having the transparent processing applied thereto are stored in a transparent texture storage 83 to be described later.

The texture adhering unit 121 adheres the texture selected by the texture selecting unit 113 to the polygon of the trace generated by the polygon generating unit 112. However, in the case that the texture selected by the texture selecting unit 113 is changed as the 3-D model is moved, the textures obtained by applying the transparent processing in the specified number of steps to the textures before and after the change are read from the transparent texture storage 83, and adhered to a specified number of polygons before and after the change.

The RAM 8 is provided with a polygon storage 81 for storing the polygons of the trace generated by the polygon generating unit 112, the texture storage 82 for storing the textures for the trace to be adhered to the polygons of the trace generated by the polygon generating unit 112, and the transparent texture storage 83 for storing the textures to which the transparent processing were applied by the texture transparent processing unit 122.

The polygon storage 81 stores coordinates of vertices of a maximum number of polygons set in advance, and deletes a data on a polygon having an earliest generation time every time a polygon is generated by the polygon generating unit 112. Alternatively, data on polygons having earlier generation times may be deleted at once at intervals of a specified time.

Figure 3:
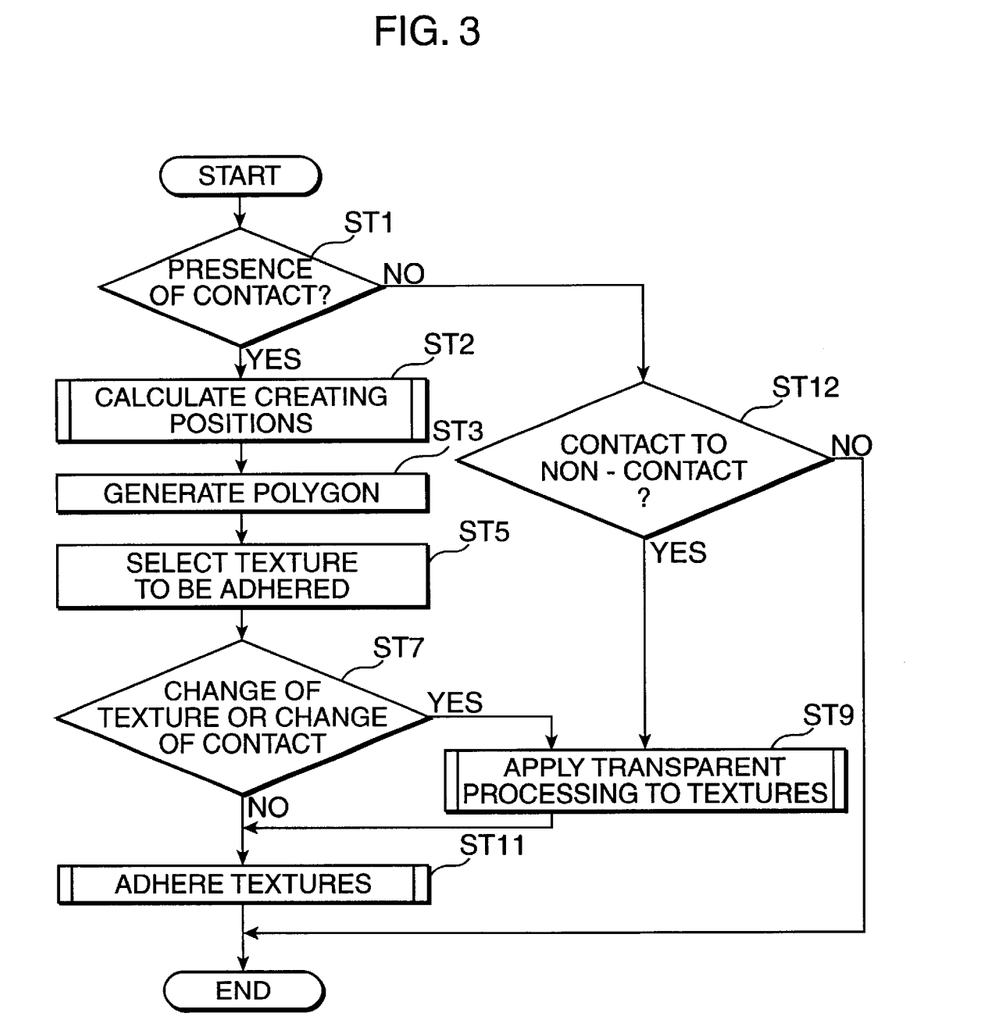
FIG. 3 is a flow chart showing a summary of a 3D image processing according to the invention.

In the following description, the 3D image processing according to the present invention is applied to, for example, create a trace a snow board leaves on a slope. FIG. 3 is a flow chart showing a summary of the 3D image processing according to the present invention. First, the contact judging unit 114 judges whether there is any contact between the slope and the snow board (Step ST1). If any contact is judged, the position calculating unit 111 calculates the positions at the opposite widthwise sides where the trace is to be created (Step ST2).

Subsequently, the polygon generating unit 112 successively determines the positions at the opposite widthwise sides where the trace is to be created as vertices to generate the polygon of the trace, which is then stored in the polygon storage 81 (Step ST3). Then, the texture suitable for the type of the slope with which the snow board is in contact is selected by the texture selecting unit 113 and is read from the texture storage 82 (Step ST5). It is then discriminated whether the texture selected by the texture selecting unit 113 has been changed or whether the result of the contact judgment made by the contact judging unit 114 (here, whether the state of contact has been changed from the absence of contact to the presence of contact) has been changed as the snow board moves (Step ST7).

If the texture selected has been changed or the result of the contact judgment has been changed, the texture transparent processing unit 122 applies the transparent processing to the textures before and after the change of the texture or to the texture selected when the presence of contact was judged, and the resulting textures are stored in the transparent texture storage 83 (Step ST9). The texture adhering unit 121 reads the textures to which the transparent processing was applied from the transparent texture storage 83 and adheres them to the polygons before and after the change of the texture or to the polygon generated when the presence of contact was discriminated (Step ST11).

Unless the texture to be selected has been changed or the result of the contact judgment has been changed, the texture selected by the texture selecting unit 113 is adhered to the polygon by the texture adhering unit 121 (Step ST11).

If the absence of contact was discriminated in Step ST1, it is discriminated whether the result of the contact judgment has been changed (here, whether the state of contact has been changed from the presence of contact to the absence of contact) (Step ST12). If the result of the contact judgment has been changed, the transparent processing is applied to the texture selected when the presence of contact was discriminated, and the processed texture is stored in the transparent texture storage 83 (Step ST9). The texture adhering unit 121 reads the texture to which the transparent processing was applied from the transparent texture storage 83 and adheres it to the polygon generated when the presence of contact was discriminated (Step ST11). The routine ends if the result of the contact judgment has not been changed (if the absence of contact has remained unchanged).

By the above operations, the textures to which the transparent processing was applied are adhered to the polygons generated after and before the change of the texture and the polygon after or before the change in the result of the contact judgment. A method for and a procedure of calculating the positions at the opposite widthwise sides of a trace creating location are described in detail later with reference to FIGS. 4 and 5, and detailed procedures of the texture transparent processing and the processing to adhere the texture to the polygon are described later with reference to FIG. 7.

Figure 4A:
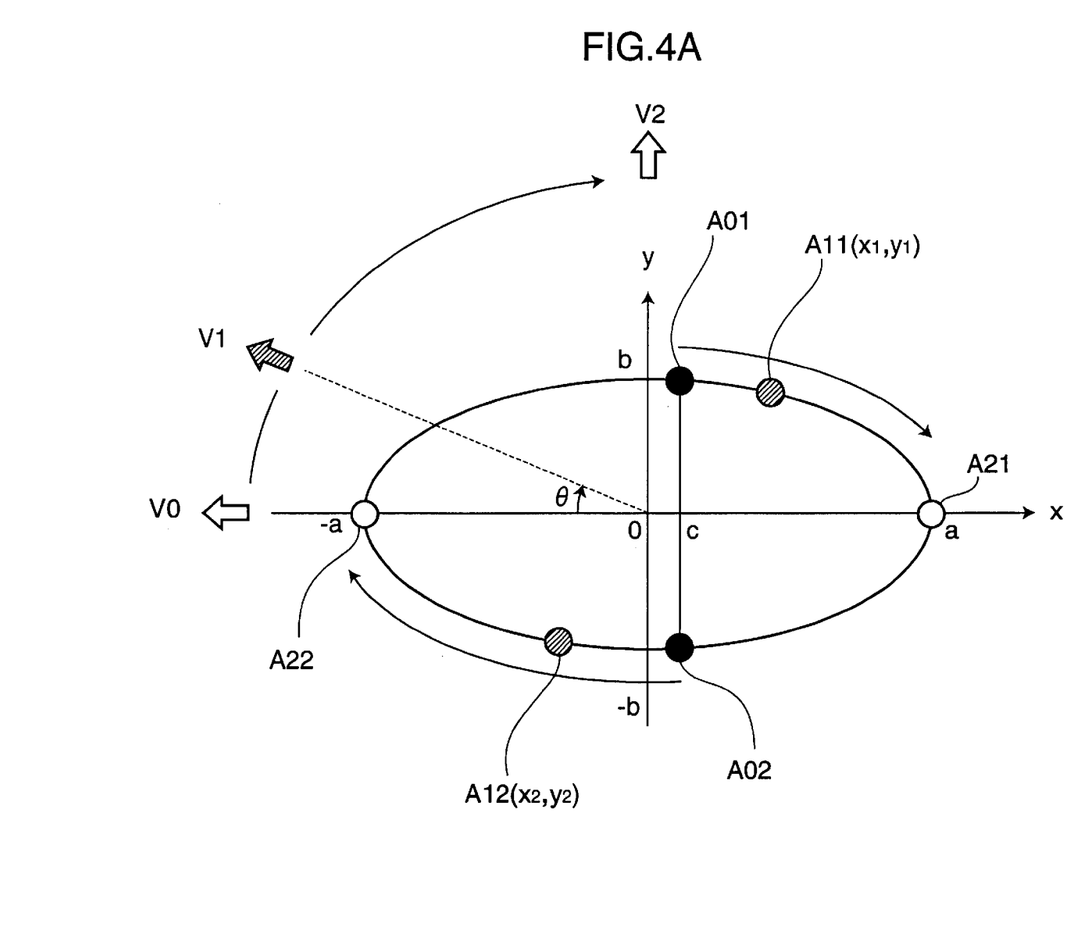
FIGS. 4A and 4B are diagrams showing a method for calculating positions at the opposite widthwise sides of a location where a trace is to be created.

FIG. 4A is a diagram showing a method for calculating the positions at the opposite widthwise sides of the trace creating location by means of the position calculating unit 111. Coordinate axes (X-axis, Y-axis) are set such that a XY-coordinate plane includes a surface of the snow board in contact with the slope (contact surface), the center of the snow board is located at an original of the coordinate systems, and the snow board is facing in (−) X-axis direction. Since the surface of the snow board in contact with the slope (contact surface) has a complicated configuration, it is approximated to an ellipse here. $2a$, $2b$ denote a major axis and a minor axis of the ellipse, respectively.

It is assumed that positions at the opposite widthwise sides of the trace creating location are points A01, A02 in the case that a sliding direction of the snow board is a direction of a vector V0 ((−) X-axis direction). Here, an X-coordinate of the points A01, A02 is c. Further, it is assumed that positions at the opposite widthwise sides of the trace creating location are points A21, A22 in the case that a sliding direction of the snow board is a direction of a vector V2 ((+) Y-axis direction). The positions at the opposite widthwise sides of the trace creating location move from A01 to A21 and from A02 to A22 along a circumference of the ellipse as shown in FIG. 4A when the sliding direction of the snow board is changed from the direction of V0 to that of V2. For example, the positions at the opposite widthwise sides of the trace creating location are points A11, A12 when the sliding direction of the snow board is a direction of a vector V1. Here, an angle formed between vector V1 and (−)X-axis direction is assumed to be $\theta$ with a clockwise direction as a positive direction.

Figure 5:
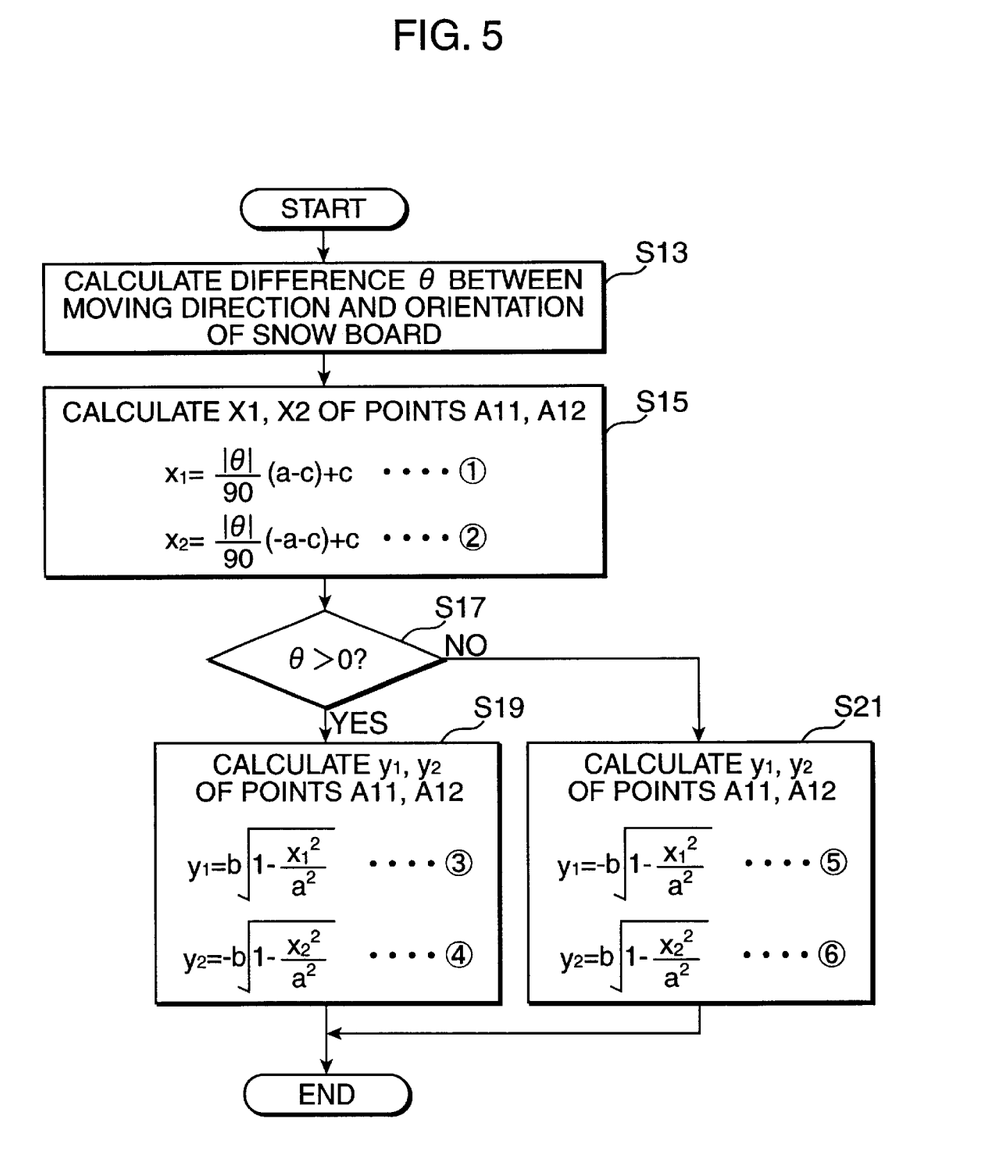
FIG. 5 is a flow chart showing a procedure of calculating the positions at the opposite widthwise sides of the location where a trace is to be created.

FIG. 5 is a flow chart showing a procedure of calculating the positions at the opposite widthwise sides of the trace creating location by means of the position calculating unit 111. First, the angle $\theta$ between the sliding direction of the snow board (direction of vector V1 of FIG. 4A) and the facing direction of the snow board ((−)X-axis direction of FIG. 4A) is calculated with the clockwise direction as the positive direction (Step ST13). Here, the angle $\theta$ lies within a range of −90° to 90°. In other words, an angular difference between the sliding direction and the facing direction of the snow board is at maximum 90°. Subsequently, the X-coordinates of the points A11, A12 as the positions at the opposite widthwise sides of the trace creating location are calculated in accordance with equations (1) and (2) shown in Step ST15. It is then discriminated whether θ>0 (Step ST17).

Figure 4B:
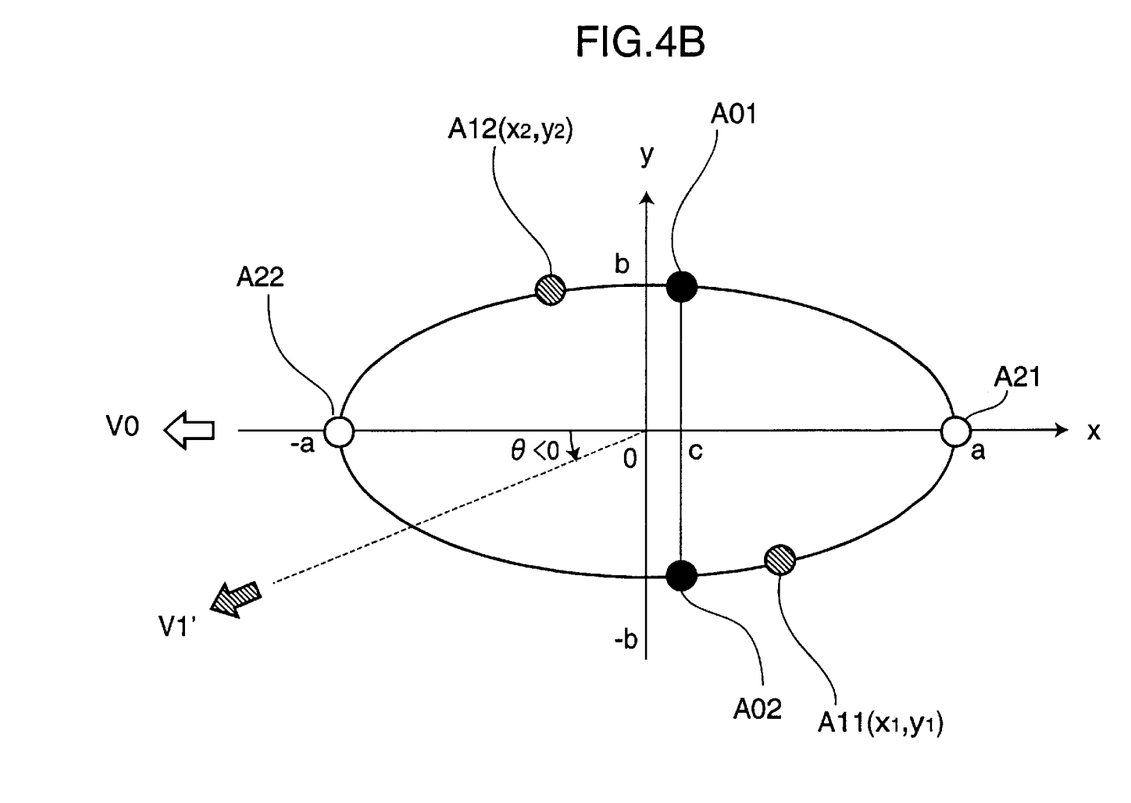

If θ>0, the Y-coordinates of the points A11, A12 as the positions at the opposite widthwise sides of the trace creating location are calculated in accordance with equations (3) and (4) shown in Step ST19. On the other hand, if θ>0 as shown in FIG. 4B, the Y-coordinates of the points A11, A12 as the positions at the opposite widthwise sides of the trace creating location are calculated in accordance with equations (5) and (6) shown in Step ST21. As can be seen from equations (5) and (6) along with FIG. 4B, the points A11 and A12 in FIG. 4A are switched in that the point A12 is along an upper half of ellipse and the point A11 is along a lower half of ellipse. In this way, the coordinates of the points A11, A12 as the positions at the opposite widthwise sides of the trace creating location are calculated.

Figure 6A:
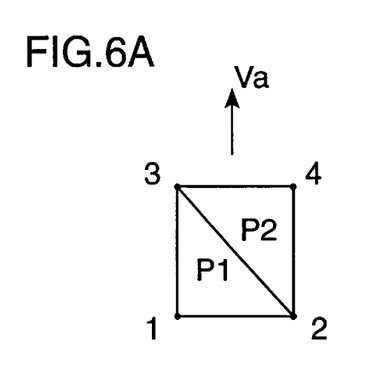
FIGS. 6A to 6C are diagrams showing an example of how polygons of a trace are generated.
Figure 6B:
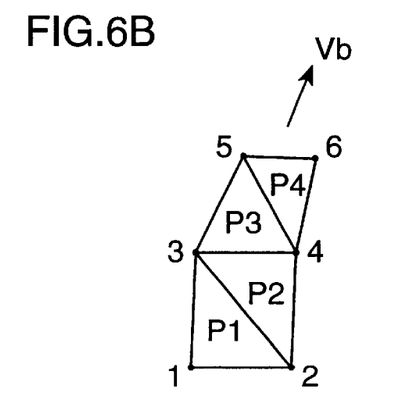
Figure 6C:
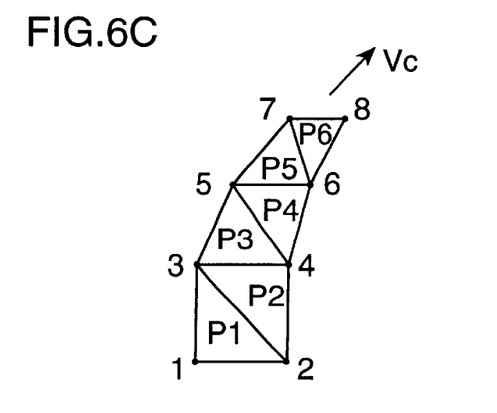

FIGS. 6A to 6C are diagrams showing an example of how polygons of a trace are generated. Polygons are generated in an order of FIG. 6A, FIG. 6B and FIG. 6C. Here, vectors Va, Vb, Vc are sliding direction of the snow board and the respective vertices of the polygons are determined, assuming that a left one of the two points of the trace creating location generated simultaneously with respect to sliding direction is generated first. In FIG. 6A, two polygons P1, P2 are generated. When a state of FIG. 6B is reached, vertices 5, 6 are determined as positions at the opposite widthwise sides of the trace creating location, and a polygon P3 is formed by vertices 3, 4, 5 while a polygon P4 is formed by vertices 4, 5, 6. When a state of FIG. 6C is reached, vertices 7, 8 are determined as positions at the opposite widthwise sides of the trace creating location, and a polygon P5 is formed by vertices 5, 6, 7 while a polygon P6 is formed by vertices 6, 7, 8. In this way, as the snow board moves, two polygons are generated every frame.

Figure 7:
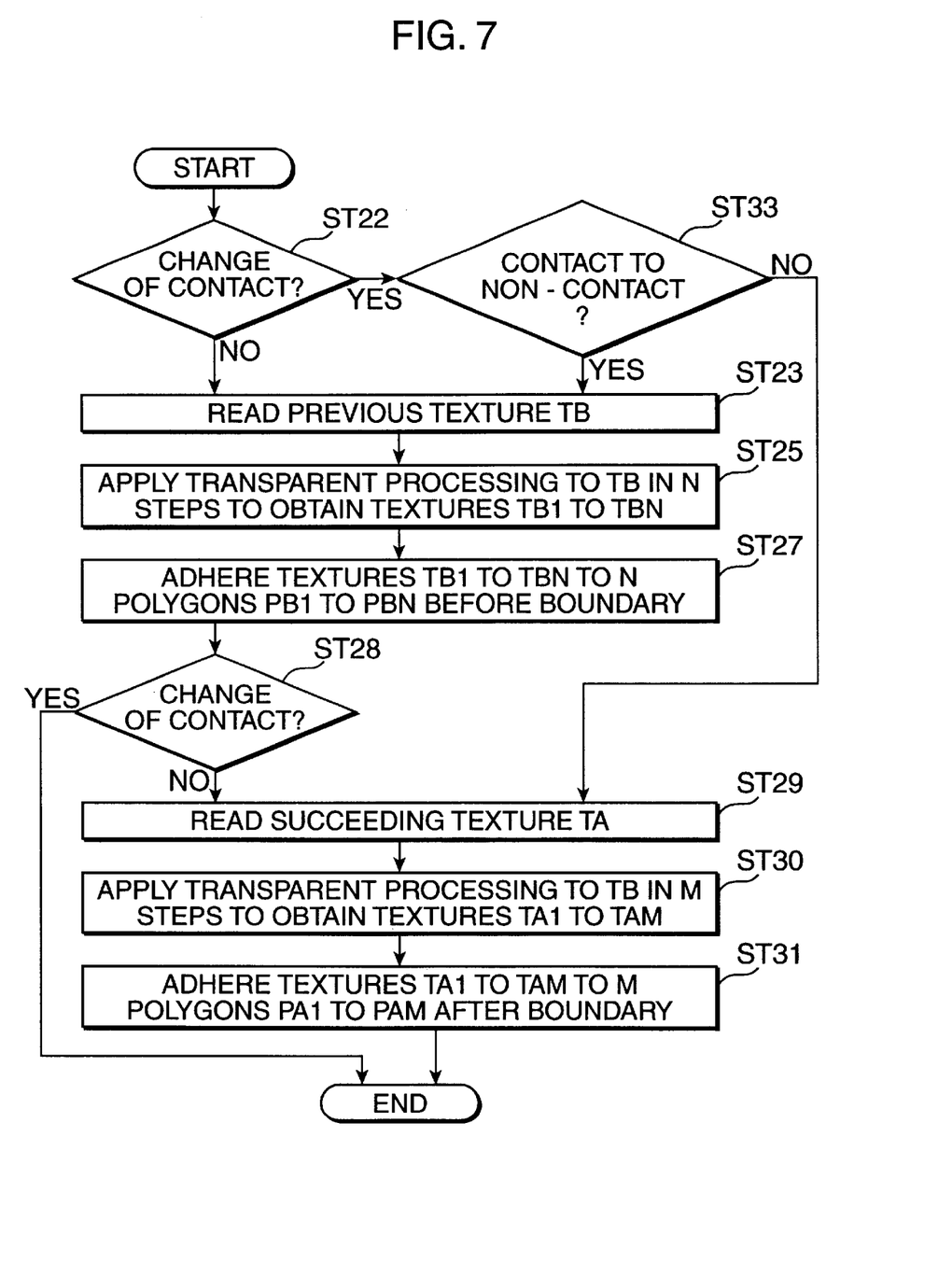
FIG. 7 is a flow chart showing a procedure of a texture transparent processing and a processing for adhering textures to polygons.

FIG. 7 is a flow chart showing the procedures of the texture transparent processing and the processing to adhere the texture to the polygon when the texture to be selected by the texture selecting unit 113 has been changed or the result of the contact judgment made by the contact judging device 114 has been changed as the snow board moves. First, it is discriminated whether the result of the contact judgment made by the contact judging unit 114 has been changed (Step ST22). Step ST23 follows if the result of the contact judgment has not been changed.

Then, a texture TB before the change of the texture (or before the presence of contact is changed to the absence of contact) is read from the texture storage 82 (Step ST23). The transparent processing is applied to the texture TB in a specified number of (here, N) steps before the change of the texture (or before the presence of contact is changed to the absence of contact) to obtain textures TB1, TB2, . . . TBN having the transparent processing applied thereto, which textures are then stored in the transparent texture storage 83 (Step ST25).

Here, it is assumed that the higher the suffix of the textures TB1, TB2, . . . TBN after the transparent processings, the more intensely the transparent processing has been applied. Subsequently, the texture adhering unit 121 adheres the textures TB1 to TBN to N polygons PB1 to PBN generated before a boundary where the texture is changed (or a boundary where the judgment on the presence or absence of contact changes) (Step ST27). Here, the polygons PB1, PB2, . . . , PBN are closer to the boundary where the texture is changed (or the boundary where the judgment on the presence or absence of contact changes) (i.e. the higher the suffix thereof, the later they are generated). By the above operations, as the boundary where the texture is changed (the boundary where the judgment on the presence or absence of contact changes) is approached, the textures to which the more intense transparent processing was applied are adhered.

Subsequently, it is discriminated whether the judgment on the presence or absence of contact made by the contact judging unit 114 has been changed (Step ST28). Unless the judgment on the presence or absence of contact made by the contact judging unit 114 has been changed, Step ST29 follows.

Then, a texture TA after the change of the texture (or after the absence of contact is changed to the presence of contact) is read from the texture storage 82 (Step ST29). The transparent processing is applied to the texture TA in a specified number of (here, M) after the change of the texture (or before the absence of contact is changed to the presence of contact) to obtain textures TA1, TA2, . . . TAM having the transparent processing applied thereto, which textures are then stored in the transparent texture storage 83 (Step ST30).

Here, it is assumed that the lower the suffix of the textures TA1, TA2, . . . TAM having the transparent processing applied thereto, the more intensely the transparent processing has been applied. Subsequently, the texture adhering unit 121 adheres the textures TA1 to TAM to M polygons PA1 to PAM generated after the boundary where the textures are changed (or the boundary where the judgment on the presence or absence of contact changes) (Step ST31). Here, the polygons PA1, PA2, PAM are closer in this order to the boundary where the textures are changed (or the boundary where the judgment on the presence or absence of contact changes) (i.e. the lower the suffix thereof, the earlier they are generated).

On the other hand, if the judgment on the presence or absence of contact has been changed in Step ST22, it is discriminated whether the presence of contact has been changed to the absence of contact (Step ST33). If the presence of contact has been changed to the absence of contact, Step ST23 follows and this routine is completed after the operations of Steps ST25 and ST27. If the absence of contact has been changed to the presence of contact, Step ST29 follows and this routine is completed after the operations of Steps ST30 and ST31.

By the above operations, as the boundary where the textures are changed (or the boundary where the judgment on the presence or absence of contact changes) is approached, the textures to which the more intense transparent processing was applied are adhered.

Figure 8:
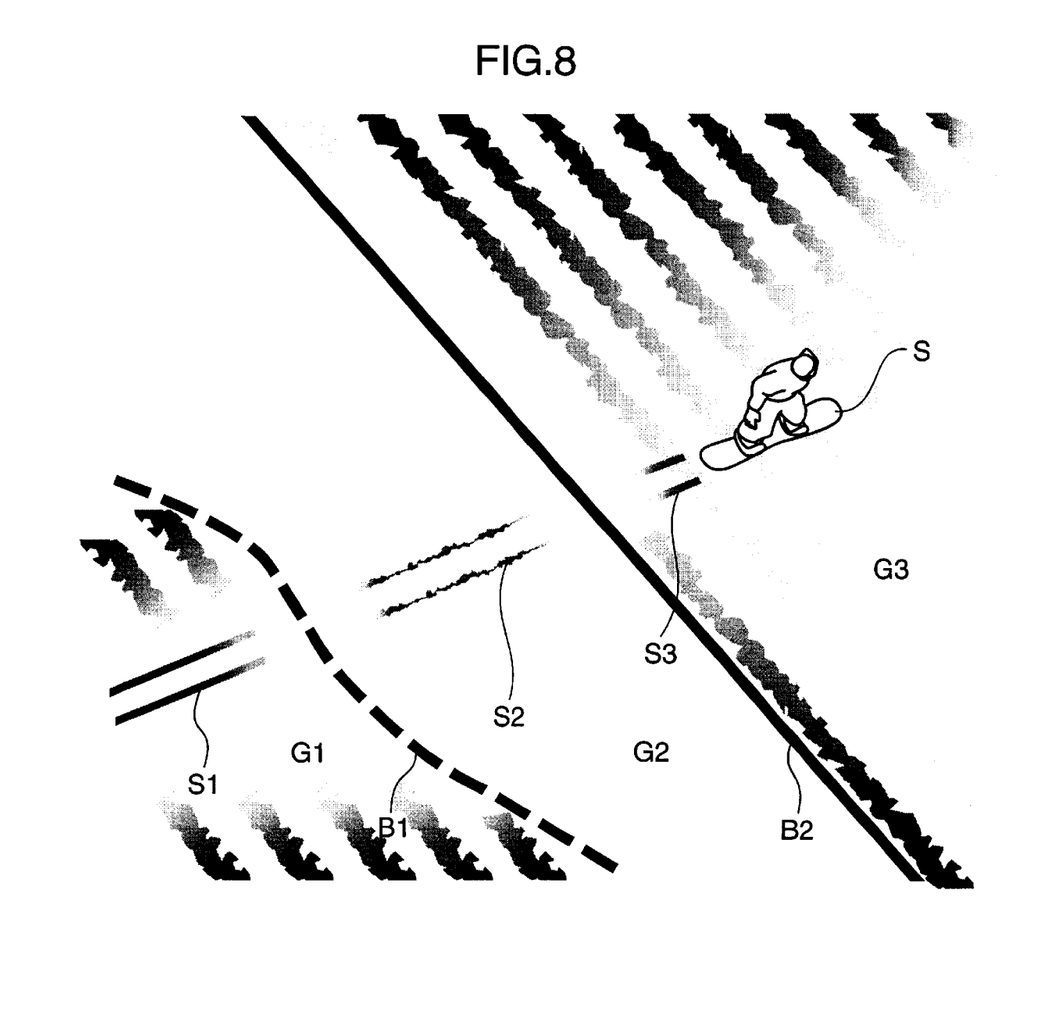
FIG. 8 is a diagram of a screen showing an example of a trace created when a snow board slides in an area having different surface types of a slope.

FIG. 8 is a diagram of a screen showing an example of a trace created when a snow board slides in an area having different surface types of a slope. The slope includes a slope G1 whose surface is soft and smooth, a slope G2 whose surface is soft and uneven, and a slope G3 whose surface is hard. Identified by B1, B2 are a boundary line between the slopes G1 and G2 and a boundary line between the slopes G2 and G3. A snow board S slides from the slope G1 to the slope G2 and further from the slope G2 to the slope G3, and a trace S1 is created on the slope G1, a trace S2 on the slope G2 and a trace S3 on the slope G3.

The trace S1 is formed by adhering textures of a distinct image since the surface of the slope G1 is soft and smooth. The trace S2 is formed by adhering textures of an image having an irregular pattern since the surface of the slope G2 is soft and uneven. Further, the trace S3 is formed by adhering textures of a light-colored image since the surface of the slope G3 is hard. A change in the trace is naturally expressed since the closer to the boundary line B1 (or boundary line B2), the more intense transparent processing is applied to the texture.

Figure 9:
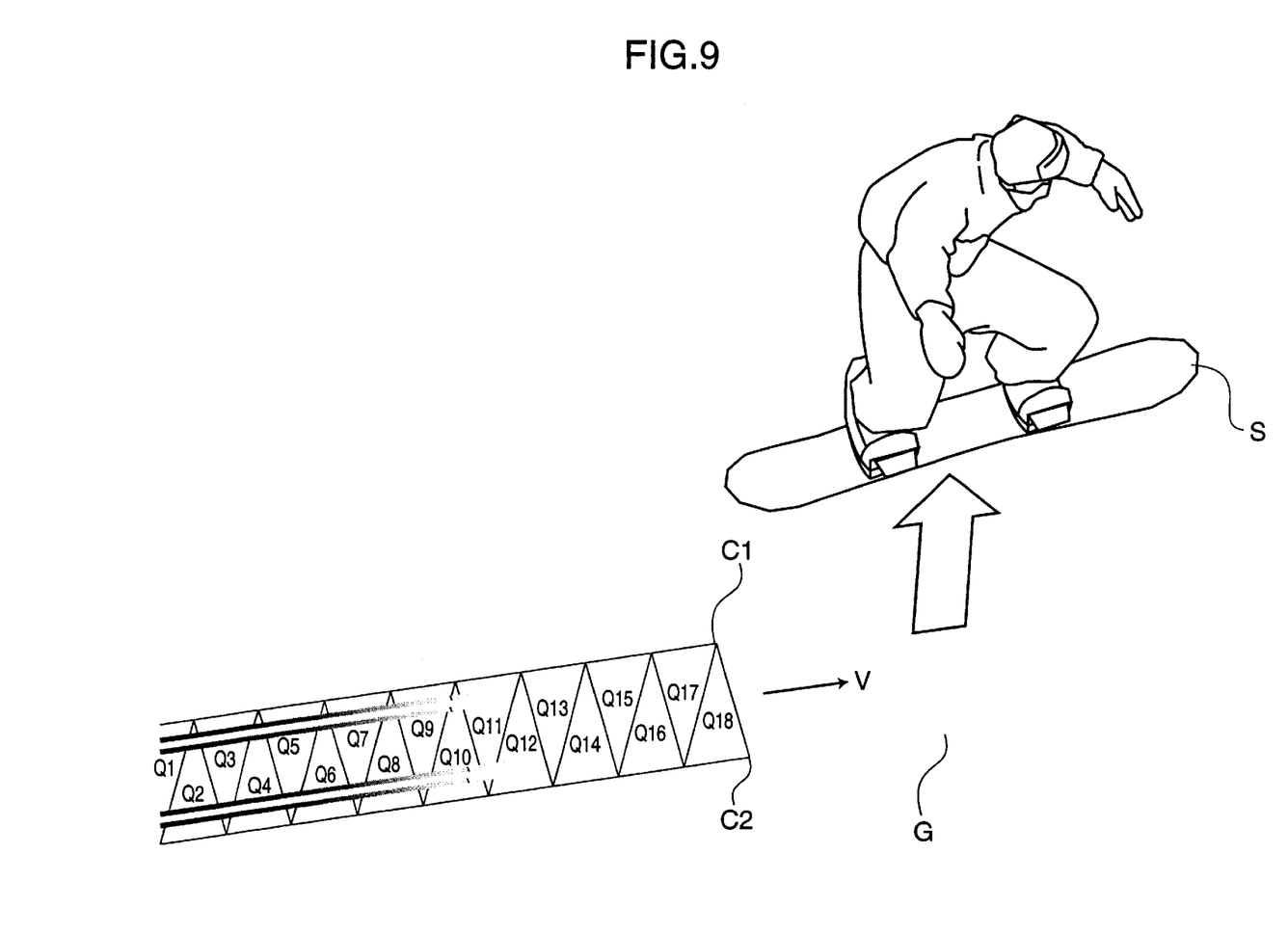
FIG. 9 is a diagram of a screen showing an example of a trace created when the snowboard jumps from the surface of the slope.

FIG. 9 is a diagram of a screen showing an example of a trace created when the snow board jumps from the surface of a slope. Polygons QK (K=1 to 18) for the trace are successively generated as shown in FIG. 18 as the snow board S slides in a direction of a vector V. When the polygon Q18 is generated, i.e. when the positions at the opposite widthwise sides where the trace is to be created become C1, C2, the snow board S jumps and is no longer in contact with the slope G. No trace is created after this point of time.

Here, the transparent processing is applied to the textures to be adhered to 11 polygons Q8 to Q18 generated before the boundary line C1-C2. The closer to the boundary line C1-C2, the more intensely the transparent processing is applied to the texture. As a result, the trace gradually becomes shallower as the snow board S approaches a point where the snow board S jumps, thereby being created in a natural manner.

The present invention may be also embodied as follows.

(A) Although the snow board slides on the slope in the foregoing embodiment, the present invention is also applicable to a case where a car runs on a dirt course or a case where a surf board slides on the water. In such a case, games having a higher versatility can be provided.

(B) Although the trace is created at two positions in the foregoing embodiment, it may be generated at one, three or more positions. In the case of one position, the polygons for the trace can be easily generated. In the case of three or more polygons, a complicated trace can be created.

(C) Although a maximum number of polygons set beforehand are stored in the foregoing embodiment, a time at which each polygon is generated may be stored as a generation time, and the polygons having existed for a predetermined time or longer may be deleted from the storage means by comparing the current time and the generation time at specified time intervals. In this embodiment, a state where the trace gradually disappears as time goes by can be expressed. Therefore, a trace, which is realistic and provides a better presence can be created, e.g. when a 3-D model moves on a water surface.

(D) Although the transparent processing is applied to the textures before and after the change when the texture to be selected is changed as the snow board moves, it may be applied to the texture either before or after the change. In this embodiment, a processing time required for the texture transparent processing and the texture adhering processing can be shortened.

(E) Although the texture storage for storing the textures is provided in the RAM 8 in the foregoing embodiment, the texture may be transferred from the storage medium 5 to the RAM 8 every time it is needed as the game progresses. In this embodiment, a necessary capacity of the RAM 8 can be reduced.

In summary, the present invention relates to a three-dimensional image processing apparatus for creating an image of a trace having a width and formed on a ground surface or a water surface as a 3-D model having a width moves in contact with the ground surface or the water surface. The three-dimensional image processing apparatus comprises position calculating means for calculating positions at opposite widthwise sides where the trace is to be created at specified time intervals, polygon generating means for generating polygons for the trace by successively determining the calculated positions at the opposite widthwise sides as vertices, polygon storage means for storing the generated polygons, texture storage means for storing textures to be adhered to the polygons, and texture adhering means for adhering the textures stored in the texture storage means to the polygons. The polygons for the trace can be easily generated by successively determining, as the respective vertices, the positions at the opposite widthwise sides where the trace is to be created. An image of the trace can be realistically and easily created by adhering the textures to these polygons.

In the aforementioned apparatus, the position calculating means may be configured to calculate the positions where the trace is to be created based on the moving direction of the 3-D model and the orientation of the 3-D model with respect to the moving direction thereof. The positions at the opposite widthwise sides where the trace is to be created can be easily calculated based on the facing direction and moving direction of the 3-D model.

In the aforementioned apparatus, the texture storage means can store a plurality of textures for the trace and may include texture selecting means for selecting a texture corresponding to the ground surface or the water surface with which the 3-D model is in contact from the plurality of the textures stored in the texture storage means, and the texture adhering means can read the texture selected by the texture selecting means from the texture storage means and adheres it to the polygon. In the case that the characteristic of the ground surface or the water surface in contact changes as the 3-D model moves, the trace of a different texture can be created. Thus, an image of the trace can be realistically created, thereby providing a better presence.

The aforementioned apparatus may further comprise texture transparent processing means for applying a transparent processing to the texture in a specified number of steps, wherein the specified number of textures having the transparent processing applied thereto are generated by reading the texture after a change from the texture storage means and applying the transparent processing to it in the specified number of steps by means of the texture transparent processing means when the texture to be selected by the texture selecting means is changed as the 3-D model moves, and the texture adhering means adheres the textures having the transparent processing applied thereto to the specified number of polygons after the change. In the case that the characteristic, the surface state and the like of the ground surface or the water surface in contact changes as the 3-D model moves, the textures for the trace to be created are gradually changed. Thus, an image of the trace can be realistically created, thereby providing a better presence.

In the three-dimensional image processing apparatus, the polygon storage means may be configured to store a time at which each polygon is generated as a generation time, and deletes the polygon having existed for a predetermined time period or longer from the polygon storage means by comparing a current time and the generation time at specified time intervals. Since a state where the trace gradually disappears as time goes by, for example, in the case that the 3-D model moves on the water surface can be expressed, the realistic trace which provides a good presence can be created.

In the three-dimensional image processing apparatus, the 3-D model can be a model liftable from the ground surface or the water surface, and contact judging means for judging whether the 3-D model is in contact with the ground surface or the water surface is further provided, wherein the position calculating means does not calculate the positions of the trace and the polygon generating means does not generate the polygons when the contact judging means judges that the 3-D model is not in contact. Since no trace is created in the case that the 3-D model is lifted from the ground surface or the water surface such as when it jumps, the realistic trace which provides a good presence can be created.

The three-dimensional image processing apparatus may further comprise texture transparent processing means for applying a transparent processing to the texture in a specified number of steps, wherein the specified number of textures having the transparent processing applied thereto are generated by reading the texture stored in the texture storage means and applying the transparent processing to it in the specified number of steps by means of the texture transparent processing means when a judgment of the contact judging means on the presence or absence of contact changes as the 3-D model moves, and the texture adhering means adheres the textures having the transparent processing applied thereto to the specified number of polygons either before or after a change. Since the textures to be adhered to the polygons for the trace before a jumping position are made gradually more transparent, for example, in the case that the 3-D model jumps, the realistic trace which provides a good presence can be created.

In addition, another form of the present invention relates to a computer-readable storage medium storing a three-dimensional image processing program for creating an image of a trace having a width and formed on a ground surface or a water surface as a 3-D model having a width moves in contact with the ground surface or the water surface. In the aforementioned computer-readable storage medium, the program comprising the steps of: calculating positions at opposite widthwise sides where the trace is to be created at specified time intervals, generating polygons for the trace by successively determining the calculated positions at the opposite widthwise sides as vertices, storing the generated polygons, storing textures to be adhered to the polygons, and adhering the stored textures to the polygons.

Furthermore, yet another form of the present invention takes form of a three-dimensional image processing method for creating an image of a trace having a width and formed on a ground surface or a water surface as a 3-D model having a width moves in contact with the ground surface or the water surface. The method comprises the steps of calculating positions at opposite widthwise sides where the trace is to be created at specified time intervals, generating polygons for the trace by successively determining the calculated positions at the opposite widthwise sides as vertices, storing the generated polygons, storing textures to be adhered to the polygons, and adhering the stored textures to the polygons.

Moreover, the present invention also relates to a video game system, which comprises any one of the aforementioned three-dimensional image processing apparatus, image display means for displaying images, program storage means for storing a game program data, and externally operable operation means, wherein the three-dimensional image processing apparatus displays images on the image display means in accordance with the game program data. Since the polygons for the trace can be easily generated by successively determining, as the respective vertices, the positions at the opposite widthwise sides where the trace is to be created, a video game system capable of realistically and easily creating an image of the trace can be realized by adhering the textures to these polygons.

This application is based on Japanese Patent Application Serial. No. 2000-333815 filed in Japan on Oct. 31, 2000, the contents of which are hereby incorporated by reference.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A three-dimensional image processing apparatus for creating an image of a trace having a width and formed on a ground surface or a water surface as a 3-D model having a width moves in contact with the ground surface or the water surface, the three-dimensional image processing apparatus comprising:

position calculating means for calculating positions at opposite widthwise sides where the trace is to be created at specified time intervals, polygon generating means for generating polygons for the trace by successively determining the calculated positions at the opposite widthwise sides as vertices, polygon storage means for storing the generated polygons, texture storage means for storing textures to be adhered to the polygons, and texture adhering means for adhering the textures stored in the texture storage means to the polygons.

2. A three-dimensional image processing apparatus according to claim 1, wherein the position calculating means calculates the positions where the trace is to be created based on the moving direction of the 3-D model and the orientation of the 3-D model with respect to the moving direction thereof.

3. A three-dimensional image processing apparatus according to claim 1, wherein the texture storage means stores a plurality of textures for the trace and includes texture selecting means for selecting a texture corresponding to the ground surface or the water surface with which the 3-D model is in contact from the plurality of the textures stored in the texture storage means, and the texture adhering means reads the texture selected by the texture selecting means from the texture storage means and adheres it to the polygon.

4. A three-dimensional image processing apparatus according to claim 3, further comprising texture transparent processing means for applying a transparent processing to the texture in a specified number of steps, wherein the specified number of textures having the transparent processing applied thereto are generated by reading the texture before a change from the texture storage means and applying the transparent processing to it in the specified number of steps by means of the texture transparent processing means when the texture to be selected by the texture selecting means is changed as the 3-D model moves, and the texture adhering means adheres the textures having the transparent processing applied thereto to the specified number of polygons before the change.

5. A three-dimensional image processing apparatus according to claim 3, further comprising texture transparent processing means for applying a transparent processing to the texture in a specified number of steps, wherein the specified number of textures having the transparent processing applied thereto are generated by reading the texture after a change from the texture storage means and applying the transparent processing to it in the specified number of steps by means of the texture transparent processing means when the texture to be selected by the texture selecting means is changed as the 3-D model moves, and the texture adhering means adheres the textures having the transparent processing applied thereto to the specified number of polygons after the change.

6. A three-dimensional image processing apparatus according to claim 1, wherein the polygon storage means stores a time at which each polygon is generated as a generation time, and deletes the polygon having existed for a predetermined time period or longer from the polygon storage means by comparing a current time and the generation time at specified time intervals.

7. A three-dimensional image processing apparatus according to claim 1, wherein the 3-D model is a model liftable from the ground surface or the water surface, and contact judging means for judging whether the 3-D model is in contact with the ground surface or the water surface is further provided, wherein the position calculating means does not calculate the positions of the trace and the polygon generating means does not generate the polygons when the contact judging means judges that the 3-D model is not in contact.

8. A three-dimensional image processing apparatus according to claim 7, further comprising texture transparent processing means for applying a transparent processing to the texture in a specified number of steps, wherein the specified number of textures having the transparent processing applied thereto are generated by reading the texture stored in the texture storage means and applying the transparent processing to it in the specified number of steps by means of the texture transparent processing means when a judgment of the contact judging means on the presence or absence of contact changes as the 3-D model moves, and the texture adhering means adheres the textures having the transparent processing applied thereto to the specified number of polygons either before or after a change.

9. A computer-readable storage medium storing a three-dimensional image processing program for creating an image of a trace having a width and formed on a ground surface or a water surface as a 3-D model having a width moves in contact with the ground surface or the water surface, the program comprising the steps of:
calculating positions at opposite widthwise sides where the trace is to be created at specified time intervals,
generating polygons for the trace by successively determining the calculated positions at the opposite widthwise sides as vertices,
storing the generated polygons,
storing textures to be adhered to the polygons, and
adhering the stored textures to the polygons.

10. A computer-readable storage medium according to claim 9, wherein the position calculating processing is performed to calculate the positions where the trace is to be created based on the moving direction of the 3-D model and the orientation of the 3-D model with respect to the moving direction thereof.

11. A computer-readable storage medium according to claim 9, wherein a plurality of textures for the trace are stored, a texture selecting processing is performed to select a texture corresponding to a characteristic of the ground surface or the water surface with which the 3-D model is in contact from the plurality of the stored textures, and the texture adhering processing is performed to read the texture selected by the texture selecting processing and adhere it to the polygon.

12. A computer-readable storage medium according to claim 11, wherein a specified number of textures having a transparent processing applied thereto are generated by reading the texture before a change and applying the transparent processing to it in the specified number of steps when the texture to be selected by the texture selecting processing is changed as the 3-D model moves, and the texture adhering processing is performed to adhere the textures having the transparent processing applied thereto to the specified number of polygons before the change.

13. A computer-readable storage medium according to claim 11, wherein a specified number of textures having a transparent processing applied thereto are generated by reading the texture after a change and applying the transparent processing to it in the specified number of steps when the texture to be selected by the texture selecting processing is changed as the 3-D model moves, and the texture adhering processing is performed to adhere the textures having the transparent processing applied thereto to the specified number of polygons after the change.

14. A computer-readable storage medium according to claim 9, wherein a time at which each polygon is generated is stored as a generation time, and the polygon having existed for a predetermined time period or longer is deleted by comparing a current time and the generation time at specified time intervals.

15. A computer-readable storage medium according to claim 9, wherein the 3-D model is a model liftable from the ground surface or the water surface, a contact judging processing is performed to judge whether the 3-D model is in contact with the ground surface or the water surface, and the position calculating processing is not performed to calculate the positions of the trace and the polygon generating processing is not performed to generate the polygons when the 3-D model is judged not to be in contact by the contact judging processing.

16. A computer-readable storage medium according to claim 15, wherein a specified number of textures having a transparent processing applied thereto are generated by reading the texture stored by the texture storing processing and applying the transparent processing to it in the specified number of steps when a judgment on the presence or absence of contact by the contact judging processing changes as the 3-D model moves, and the texture adhering processing is performed to adhere the textures having the transparent processing applied thereto to the specified number of polygons either before or after the change.

17. A three-dimensional image processing method for creating an image of a trace having a width and formed on a ground surface or a water surface as a 3-D model having a width moves in contact with the ground surface or the water surface, comprising the steps of:
calculating positions at opposite widthwise sides where the trace is to be created at specified time intervals,
generating polygons for the trace by successively determining the calculated positions at the opposite widthwise sides as vertices,
storing the generated polygons,
storing textures to be adhered to the polygons, and
adhering the stored textures to the polygons.

18. A video game system comprising:
a three-dimensional image processing apparatus for creating an image of a trace having a width and formed on a ground surface or a water surface as a 3-D model having a width moves in contact with the ground surface or the water surface, the three-dimensional image processing apparatus including:

position calculating means for calculating positions at opposite widthwise sides where the trace is to be created at specified time intervals, polygon generating means for generating polygons for the trace by successively determining the calculated positions at the opposite widthwise sides as vertices, polygon storage means for storing the generated polygons, texture storage means for storing textures to be adhered to the polygons, and texture adhering means for adhering the textures stored in the texture storage means to the polygons, image display means for displaying images, program storage means for storing a game program data, and externally operable operation means, wherein the three-dimensional image processing apparatus displays images on the image display means in accordance with the game program data.

19. A three-dimensional image processing apparatus for creating an image of a trace having a width and formed on a ground surface or a water surface as a 3-D model having a width moves in contact with the ground surface or the water surface, the three-dimensional image processing apparatus comprising:

position calculating means for calculating positions at opposite widthwise sides where the trace is to be created at specified time intervals, such that the width of said trace varies in accordance with a result calculated by the position calculating means, polygon generating means for generating polygons for the trace by successively determining the calculated positions at the opposite widthwise sides as vertices, polygon storage means for storing the generated polygons, texture storage means for storing textures to be adhered to the polygons, and texture adhering means for adhering the textures stored in the texture storage means to the polygons.

20. A three-dimensional image processing apparatus for creating an image of a trace having a width and formed on a ground surface or a water surface as a 3-D model having a width moves in contact with the ground surface or the water surface, the three-dimensional image processing apparatus comprising:

position calculating means for calculating positions at opposite widthwise sides where the trace is to be created at specified time intervals, polygon generating means for generating polygons for the trace by successively determining the calculated positions at the opposite widthwise sides as vertices, polygon storage means for storing the generated polygons, texture storage means for storing textures to be adhered to the polygons, and texture adhering means for adhering the textures stored in the texture storage means to the polygons, wherein the position calculating means calculates the positions where the trace is to be created based on the moving direction of the 3-D model and the orientation of the 3-D model with respect to the moving direction thereof so that the widthwise dimension of the trace varies according to said moving direction and said orientation of said model.

* * * * *